United States Patent
Han et al.

(10) Patent No.: US 9,160,683 B2
(45) Date of Patent: Oct. 13, 2015

(54) PROVIDING PIM-SSM SUPPORT FOR MRSVP-TE BASED MULTICAST VIRTUAL PRIVATE NETWORKS

(71) Applicant: Futurewei Technologies, Inc., Plano, TX (US)

(72) Inventors: Lin Han, San Jose, CA (US); Renwei Li, Fremont, CA (US); Katherine Zhao, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 126 days.

(21) Appl. No.: 13/931,548

(22) Filed: Jun. 28, 2013

(65) Prior Publication Data

US 2014/0003245 A1    Jan. 2, 2014

Related U.S. Application Data

(60) Provisional application No. 61/666,639, filed on Jun. 29, 2012.

(51) Int. Cl.
| | |
|---|---|
| *H04J 3/08* | (2006.01) |
| *H04J 3/14* | (2006.01) |
| *H04L 12/28* | (2006.01) |
| *H04L 12/927* | (2013.01) |
| *H04L 12/913* | (2013.01) |

(52) U.S. Cl.
CPC ............ *H04L 47/806* (2013.01); *H04L 47/724* (2013.01)

(58) Field of Classification Search
None
See application file for complete search history.

(56) References Cited

U.S. PATENT DOCUMENTS

| | | | |
|---|---|---|---|
| 2008/0130515 A1* | 6/2008 | Vasseur | 370/254 |
| 2008/0298360 A1* | 12/2008 | Wijnands et al. | 370/389 |
| 2011/0188499 A1* | 8/2011 | Wijnands et al. | 370/390 |

OTHER PUBLICATIONS

Li, R., et al., "Receiver-Driven Multicast Traffic Engineered Label Switched Paths," draft-lzj-mpls-receiver-driven-multicast-rsvp-te-00.txt, Network Working Group, Standards Track, Mar. 4, 2012, pp. 1-25.
Bradner, S., "Key Words for use in RFCs to Indicate Requirement Levels," Network Working Group, Best Current Practice, Mar. 1997, RFC2119, pp. 1-3.
Braden, R., et al., "Resource ReSerVation Protocol (RSVP)," Version 1 Functional Specification, Network Working Group, Standards Track, Sep. 1997, RFC 2205, pp. 1-113.
Awduche, D., et al., "RSVP-TE: Extensions to RSVP for LSP Tunnels," Network Working Group, Standards Track, Dec. 2001, RFC 3209, pp. 1-62.

(Continued)

*Primary Examiner* — Kiet G Tang
(74) *Attorney, Agent, or Firm* — Conley Rose, P.C.; Grant Rodolph; William H. Dietrich

(57) ABSTRACT

In a receiver provider edge (PE) router, a method for supporting protocol independent multicast source-specific mode (PIM-SSM) using multicast resource reservation protocol-traffic engineering (mRSVP-TE) comprising the steps of receiving a protocol independent multicast (PIM) join message, in response to receiving the PIM join message sending a path message to a source PE router, wherein the path message is a multicast resource reservation protocol-traffic engineering (mRSVP-TE) message, and sending the PIM join message to the source PE router, wherein the path message and the PIM join message trigger setup of a data multicast data tree (MDT), creating a PIM state, and receiving multicast data traffic via the data MDT using the PIM state.

20 Claims, 11 Drawing Sheets

(56) References Cited

OTHER PUBLICATIONS

Fenner, B., et al., "Protocol Independent Multicast-Sparse Mode (PIM-SM): Protocol Specification (Revised)," Network Working Group, Standards Track, Aug. 2006, RFC 4601, pp. 1-112.

Aggarwal, R., et al., "Extensions to Resource Reservation Protocol—Traffic Engineering (RSVP-TE) for Point-to-Multipoint TE Label Switched Paths (LSPs)," Network Working Group, Standards Track, May 2007, RFC 4875, pp. 1-53.

Bhaskar, N., et al., "Bootstrap Router (BSR) Mechanism for Protocol Independent Multicast (PIM)," Network Working Group, Standards Track, Jan. 2008, RFC 5059, pp. 1-41.

Rosen, E., et al., "Cisco Systems' Solution for Multicast in BGP/MPLS IP VPNs," Independent Submission, Historic, Oct. 2010, RFC 6037, pp. 1-25.

Wijnands, IJ., et al., "Label Distribution Protocol Extensions for Point-to-Multipoint and Multipoint-to-Multipoint Label Switched Paths," Internet Engineering Task Force (IETF), Standards Track, Nov. 2011, RFC 6388, pp. 1-39.

Rosen, E., et al., "Multicast in MPLS/BGP IP VPNs," Internet Engineering Task Force (IETF), Standards Track, Feb. 2012, RFC 6513, pp. 1-88.

Aggarwal, R., et al., "BGP Encodings and Procedures for Multicast in MPLS/BGP IP VPNs," Internet Engineering Task Force (IETF), Standards Track, Feb. 2012, RFC 6514, pp. 1-59.

\* cited by examiner

PROVIDING PIM-SSM SUPPORT FOR MRSVP-TE BASED MULTICAST VIRTUAL PRIVATE NETWORKS

CROSS-REFERENCE TO RELATED APPLICATIONS

The present application claims benefit of U.S. Provisional Patent Application No. 61/666,639 filed Jun. 29, 2012 by Lin Han, et al. and entitled "Methods to Provide PIM-SSM Support For mRSVP-TE Based mVPN Solutions," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A multicast virtual private network (mVPN) allows a service provider to configure and support multicast traffic in a multiprotocol label switching (MPLS) virtual private network (VPN) environment. For example, an mVPN may support the routing and forwarding of multicast data packets for VPN routing and forwarding (VRF) instances and provide a mechanism to transport VPN multicast data packets across the service provider backbone. mVPNs may be useful for video conferencing or customer specific broadcasting as examples.

An mVPN provides transparent interconnection within its private network across the network backbone of a service provider. Multicast services are a bandwidth conserving solution to reduce data traffic by delivering a single data stream to a plurality of receivers. For example, multicast data services may deliver source traffic to multiple receivers without adding additional burdens on the source or the receivers while using minimal network bandwidth.

There are various existing solutions for supporting mVPN on a service provider's network. The solutions may be used to carry protocol independent multicast (PIM) signaling from customers over a service provider's network. However, the solutions may be complex to implement and lack scalability across a service provider's network. For example, at least one solution involves using border gateway protocol (BGP). The solution may require BGP to be extended with seven types of Network Layer Reachability Information (NLRI) and four new BGP attributes. As such, it may be desirable to provide simpler and more scalable means for providing quality-of-service (QoS) assurance and traffic-engineering (TE) path support for mVPN applications.

SUMMARY

In example embodiments, protocol independent multicast source-specific mode (PIM-SSM) is supported using multicast resource reservation protocol-traffic engineering (mRSVP-TE).

PIM-SSM is supported in receiver provider edge (PE) routers. In an example embodiment, a PIM join message is received by a receiver PE router. Furthermore, in response to receiving the PIM join message a path message is sent to a source PE router, wherein the path message is an mRSVP-TE message. The PIM join message is sent to the source PE router, wherein the path message and the PIM join message trigger setup of a data multicast distribution tree (MDT). A PIM state is created in the receiver PE router, and multicast data traffic is received via the data MDT using the PIM state.

PIM-SSM is supported in source PE routers. In an example embodiment, a PIM join message is received by a source PE router from at least one receiver PE router via a default MDT, wherein the PIM join message comprises a source address and a group address. A PIM state is created using the source address and the group address. Finally, multicast data traffic is transmitted via the default MDT using the PIM state. In another example embodiment, a PIM join message is received from at least one receiver PE router via a default MDT, wherein the PIM join message comprises a source address and a group address. In response to receiving the PIM join message, an MDT join message is sent to the at least one receiver PE router, wherein the MDT join message comprises an MDT number that identifies a data MDT. Next a path message is received from the at least one receiver PE router thereby forming the data MDT. A PIM state is created using the source address and the group address. Multicast traffic may be sent via the data MDT using the PIM state.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

Figure 1:
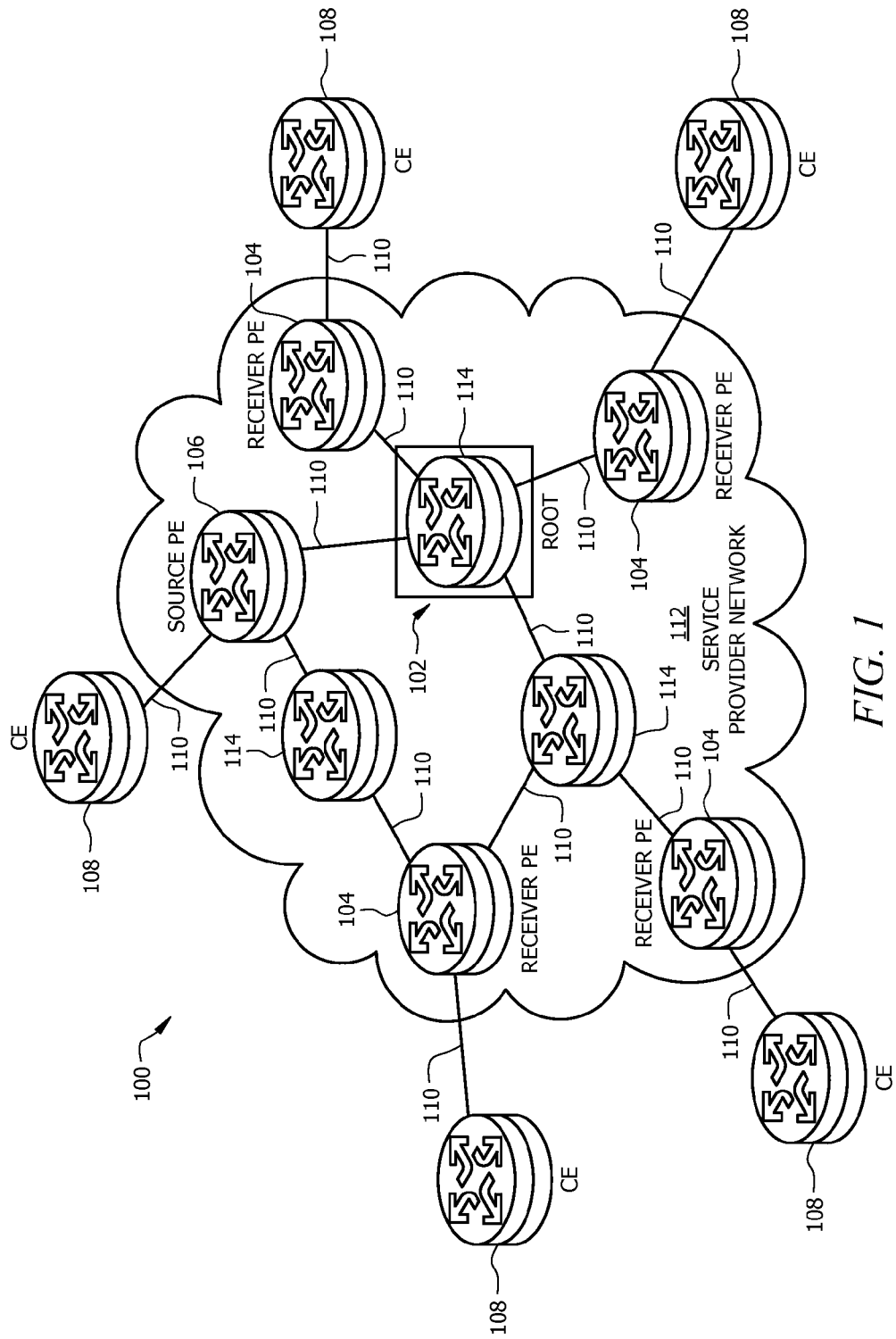
FIG. 1 is a schematic view of an example embodiment of a network.

It should be understood at the outset that although an illustrative implementation of one or more example embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An mVPN may operate as portion of a networking infrastructure. For example, an mVPN may form a portion of a network layer within an Open Systems Interconnection (OSI) model of a network architecture. The network layer may be configured to provide path determination and logical addressing for data traffic (e.g., one or more data packets) communicated through a network. As such, the network layer may provide function and/or procedural means of transferring data traffic from a source host on a network to one or more destination hosts on the same or different network. For example, the network layer may be responsible for routing functions, encapsulation, data packet fragmentation, data packet reassembly, delivery error reporting, any other suitable data packet processing or handling function as would be appreciated by one of ordinary skill in the art upon viewing this disclosure, or combinations thereof.

Multicast data traffic is communicated via multicast tree (e.g., a multicast distribution tree (MDT)) which may comprise two or more networks, for example, an MPLS network operated by a service provider and an internet protocol (IP) network on a customer's site. For example, multicast data traffic may start on a customer's site as an IP multicast and then may be communicated over the MPLS network to other customer's sites. Additionally, in such an example, the multicast data traffic may be distributed over a protocol independent multicasting (PIM) MDT on the customer's site and over via multicast-label-switched-path (mLSP) tunnels in the service provider's MPLS network.

Disclosed herein are example embodiments of an mVPN utilizing a PIM with an MDT. In one or more example embodiments disclosed herein, the mVPN is generally configured to employ multicast resource reservation protocol-traffic engineering (mRSVP-TE) to provide multicast services to deliver data traffic to a plurality of receivers. MRSVP-TE is an extension to resource reservation protocol-traffic engineering (RSVP-TE) for multicast applications within an MPLS network and may employ features from RSVP-TE, such as, QoS assurance and TE paths. However, in contrast to RSVP-TE where a multicast data tree may be set up by a multicast source or head node of the multicast data tree, the multicast data tree in mRSVP-TE may be driven by one or more multicast receivers or leaf nodes. As disclosed herein, in an example embodiment where PIM is used on a customer's site and mRSVPT-TE is used on a service provider's network without PIM being enabled, an mVPN may be employed to employ a PIM-SSM protocol to support mRSVP-TE multicast data services between a source host and a plurality of receiver hosts.

Referring to FIG. 1 an example embodiment of a network 100 is illustrated. The network 100 may be configured as an mVPN, and the network 100 is referred to as mVPN 100 hereafter. The mVPN 100 generally comprises a plurality of routers (e.g., label switch routers (LSRs)), for example a root router 102, one or more receiver provider edge (PE) routers 104, one or more source PE routers 106, one or more customer edge (CE) routers 108, and one or more core routers 114. Additionally, the plurality of routers (e.g., the root router 102, the receiver PE routers 104, the source PE router 106, the CE routers 108, the core routers 114, etc.) may be interconnect and in data communication with each other via one or more links 110 (e.g., a wireless link or a wired link). Further, the mVPN 100 is configured to employ an internet group management protocol (IGMP), an intermediate system to system (IS-IS) protocol, a routing information protocol (RIP), a border gateway protocol (BGP), a distance vector multicast routing protocol (DVMRP), a multicast open shortest path first (MOSPF), and/or any suitable routing protocol as would be appreciated by one of ordinary skill in the art upon viewing this disclosure.

In an example embodiment, the mVPN 100 is configured to employ a PIM source-specific multicast (PIM-SSM) protocol. In such an example embodiment, the mVPN 100 is configured to establish, identify, and/or track one or more PIM states (e.g., virtual connections) between a source PE router 106 and one or more receiver PE routers 104, for example, via a PIM state table, PIM (source, group) or (S, G) channel, PIM channel, or the-like. In an additional or alternative example embodiment, any other suitable PIM-SSM standard and/or protocol may be employed as would be appreciated by one of ordinary skill in the art upon viewing this disclosure. In such examples, the source (S) identifies a source address and the group (G) identifies an SSM destination address. The receiver PE router 104 is configured to transmit an (S, G) join message (e.g., a data packet) to the source address to subscribe to an (S, G) channel. Additionally, the source PE router 106 is configured to provide multicast data services upon subscribing a receiver PE router 104 to the channel (S, G). As such, the SSM protocol may provide host applications with a "channel" abstraction, in which each channel has a source PE router 106 and any number of receiver PE routers 104. In an additional example embodiment, the mVPN 100 may be further configured to employ one or more additional PIM multicasting protocols (e.g., PIM dense mode (PIM-DM), PIM sparse mode (PIM-SM), bidirectional PIM (BIDIR-PIM), etc.).

The plurality of routers (e.g., the root router 102, the receiver PE routers 104, the source PE routers 106, the CE routers 108, the core routers 114, etc.) may each be a device configured to forward data packets within a network and/or between multiple networks. For example, a core router 114 may be a router within a service provider network 112 and may be configured to form a portion of a backbone or core for the service provider network 112. A receiver PE router 104 and/or a source PE router 106 may be a router within the service provider network 112 which may be configured to form an interface between the service provider network 112 and one or more CE routers 108. Each PE router (e.g., the receiver PE router 104 and the source PE router 106) comprises a reverse-path forwarding (RPF) interface or provider multicast service interface (PMSI), such as, an incoming interface (IIF) for PIM state and an outgoing interface (OIF) for PIM state, for example, to manage data traffic forwarding within the mVPN 100. In an example embodiment, the IIF and/or the OIF may be configured as a selective provider multicast service interface (S-PMSI) for point-to-multipoint (P2MP) tunnels, as will be disclosed herein. Alternatively, the IIF and/or the OIF may be configured as a multidirectional inclusive provider multicast service interface (MI-PMSI) for multipoint-to-multipoint (MP2MP) tunneling, as will be disclosed herein. Additionally, each PE router may further comprise and an outgoing interface list (OLIST) for PIM state. In an example embodiment, an MI-PMSI interface may be an interface between an IP multicast tree and an MDT. In such an example embodiment, when an MI-PMSI is an OIF in an OLIST for a multicast forwarding entry (S, G), the IP multicast stream (S, G) is replicated for the MI-PMSI and sent to the MI-PMSI interface. In another example embodiment, when the MI-PMSI is an IIF for a multicast forwarding entry (S, G), a data packet (e.g., an MPLS packet) received is forwarded by the forwarding entry (S, G) if the decapsulated data packet is an IP packet and if the source and group are S and G, respectively.

A source PE router 106 may be generally characterized as a PE router where a multicast source (e.g., a source host) is located on or behind a CE router 108. Additionally, a source PE router 106 may be characterized as having an internet protocol (IP) on the IIF and an MDT (e.g., a default MDT, a data MDT, etc.) on the OIF. Alternatively, a receiver PE 104 may be generally characterized as a PE router where a multicast receiver (e.g., a receiver host) is located on or behind a CE router 108. Additionally, a receiver PE router 104 may be characterized as having an MDT (e.g., a default MDT, a data MDT, etc.) on an IIF and an IP on an OIF. A CE router 108 may be a router controlled or operated by a customer (e.g., a router located at a customer's premises) which is configured to connect to the service provider network 112, for example, via a PE router. Referring to the example embodiment of FIG. 1, the mVPN 100 comprises the root router 102 in data communication with the receiver PE routers 104, the source PE router 106, and the core routers 114. Additionally, the PE routers (e.g., the receiver PE routers 104 and the source PE routers 106) are each in data communication with a CE router 108. Additionally, each of the routers may be configured to employ a routing table, forwarding table, an mVPN table, or the-like, to control and/or direct data traffic for a given mVPN. For example, each of the routers may generate or establish a routing table to coordinate data communication with other routers within the mVPN 100. In an example embodiment, the routing table may be established via a flooding algorithm, a spanning trees algorithm, a reverse path broadcasting algorithm, a truncated reverse path broadcasting algorithm, a reverse path multicasting algorithm, a core-based tree algorithm, or any other suitable multicast forwarding algorithm as would be appreciated by one of ordinary skill in the art upon viewing this disclosure. Additionally, one or more routers (e.g., a root router 102, a receiver PE router 104, a source PE router 106, etc.) may comprise a settable data traffic flow threshold (e.g., an upper data traffic flow rate limit) and may be configured to initiate a data MDT formation in response to exceeding the data traffic flow threshold, as will be disclosed herein.

As would be appreciated by one of ordinary skill in the art a multicast-label-switched-path (mLSP) may also be referred to as an MDT and as such the terms may be used interchangeably. An MDT is generally configured to provide multicast services for the mVPN 100. For example, one or more MDTs may be established and each may define one or more paths (e.g., virtual paths) within the mVPN 100 via the plurality of routers (e.g., the root router 102, the receiver PE routers 104, the source PE routers 106, the CE routers 108, the core routers 114, etc.) to control and/or direct the flow of data traffic through the mVPN 100, for example, to provide multicast services between a source host and a plurality of receiver hosts who are interested in a particular multicast data stream. The MDT may comprise one or more sub-label switched-paths (sub-LSP) which connect a plurality of routers (e.g., LSRs, core routers, source PE routers, receiver PE routers, etc.) to form an MPLS multicast network. An MDT may be configured as a default MDT to provide MP2MP data packet communication, as will be disclosed herein. In such an example, the root router 102 is the head of the default MDT and each of the PE routers are the leaf PEs of the default MDT. Alternatively, an MDT may be configured as a data MDT to provide P2MP data packet communication, as will be disclosed herein. In an example embodiment, an MDT may be head driven or leaf driven. For example, in a leaf driven MDT, any leaf PE (e.g., a source PE router 106) may initiate a data MDT, as will be disclosed herein.

In the example embodiment, a default MDT may comprise the root router 102 in data communication with a plurality of PE routers (e.g., the receiver PE routers 104 and/or the source PE routers 106). Additionally, each of the PE routers is in data communication with a CE router coupled to a host (e.g., a source host, a receiver host, etc.). A default MDT may be configured to perform signaling, forming one or more MDTs (e.g., a data MDT, as will be disclosed), pruning an MDT (e.g., removing inactive PE routers), adding nodes (e.g., PE routers) to an MDT, communicating multicast data traffic, performing any other suitable multicast service operation as would be appreciated by one of ordinary skill in the art upon viewing this disclosure, or combination thereof. The default MDT is configured such that every PE router within the mVPN 100 may be utilized as a source PE router and/or a receiver PE router, for example, every PE router is capable of sending and/or receiving multicast data traffic. Further, the default MDT is configured to provide bidirectional communication between the routers (e.g., PE routers). For example, the default MDT may be configured to communicate a PIM signaling message and/or a data packet. For example, the default MDT may support PIM signaling messages, such as, join/prune messages, hello messages, assert messages, bootstrap messages, etc.

In an example embodiment, a data MDT may be generally configured to offload data traffic from a default MDT, for example, to minimize or reduce wasted bandwidth for one or more routers. In an example embodiment, the data MDT comprises a source host (e.g., a source terminal) in signal communication (e.g., via a source PE router 106) with a plurality of receiver hosts (e.g., via a plurality of receiver PE routers 104). In such an example embodiment, the data MDT is configured to communicate multicast data traffic only to interested receivers (e.g., receiver hosts) and thereby preserve the bandwidth of disinterested receivers and/or routers, as will be disclosed herein. The data MDT is configured such that a source PE router 106 communicates with one or more receiver-PE routers 104. The data MDT may be configured to be established or built up statically and/or dynamically. For example, when the data MDT is configured to be built statically, the data MDT may be configured to be established in response to a path message being communicated from one or more receiver PE routers 104 to a source PE router 106. Alternatively, when the data MDT is configured to be built dynamically, the data MDT may be configured to be established in response to exceeding a predetermined threshold of multicast data traffic. Additionally, the data MDT may be configured to operate similar to a data MDT for a multicast generic routing encapsulation (mGRE) based mVPN.

Additional details for configuring and/or establishing a default MDT and a data MDT may be as described in U.S. patent application Ser. No. 13/931,434 filed Jun. 28, 2013 and entitled "Multicast Distribution Trees for mRSVP-TE Based Multicast Virtual Private Networks" by Lin Han, et al., which is hereby incorporated by reference in its entirety.

Referring to FIGS. 2-6, one or more signaling data packets may be communicated between the routers (e.g., the root router 102, the receiver PE routers 104, the source PE routers 106, the CE routers 108, the core routers 114, etc.) of the mVPN 100, for example, to establish one or more MDTs (e.g., a default MDT or a data MDT). For example, a source host may communicate a one or more signaling data packets to one or more receiver hosts to form a default MDT and/or a data MDT, as will be disclosed herein.

Figure 2:
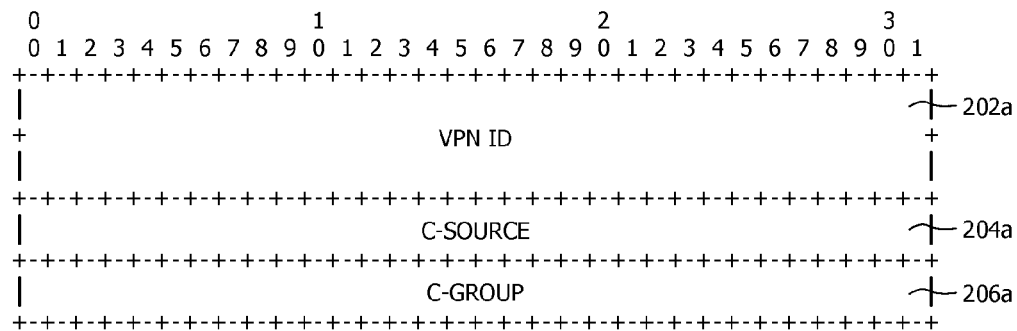
FIG. 2 is an example embodiment of a path message data packet.
Figure 3:
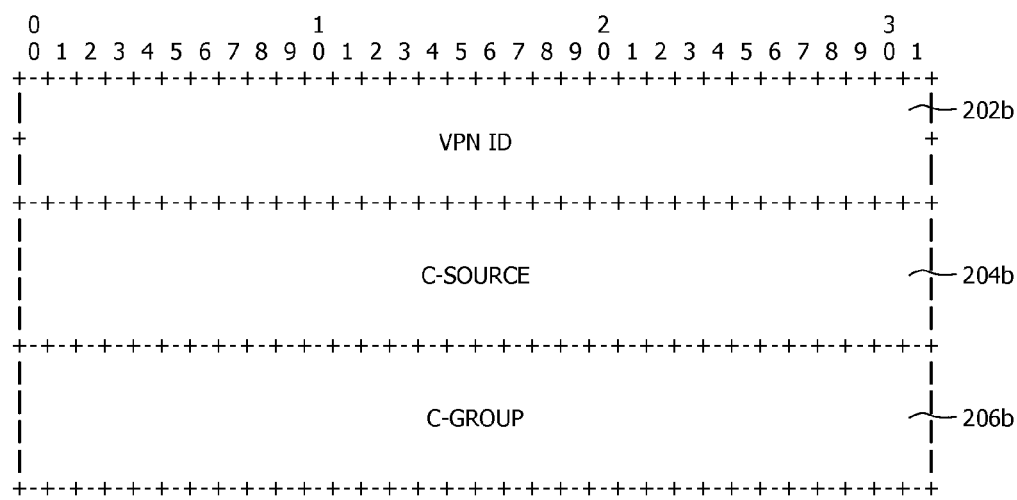
FIG. 3 is another example embodiment of a path message data packet.
Figure 4:
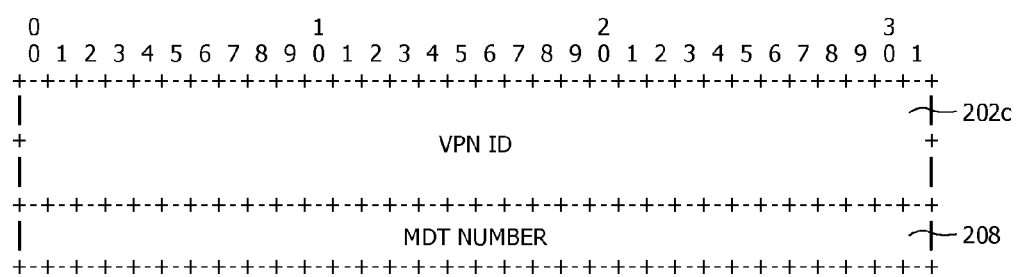
FIG. 4 is another example embodiment of a path message data packet.

Referring to FIGS. 2-4, an mRSVP-TE path message data packet (e.g., an mRSVP-TE path message data packet 200a, 200b, and 200c, respectively) or path message is illustrated. In the example embodiment of FIG. 2, the mRSVP-TE path message data packet 200a comprises a plurality of data fields, for example, a VPN identification (ID) 202a, a customer source (c-source) address field 204a, and a customer group (c-group) address field 206a. Referring to FIG. 2, the mRSVP-TE path message data packet 200a for internet protocol version 4 (IPv4) comprises a 64-bit VPN ID 202a, a 32-bit c-source address field 204a, and a 32-bit c-group address field 206a.

In the example embodiment of FIG. 3, the mRSVP-TE path message data packet 200b each comprise a plurality of data fields, for example, a VPN identification (ID) 202b, a c-source address field 204b, and a c-group address field 206b. Referring to FIG. 3, the mRSVP-TE path message data packet 200b for IPv6 comprises a 64-bit VPN ID 202b, a 128-bit c-source address field 204b, and a 128-bit c-group address field 206b.

While the example embodiments of FIGS. 2 and 3 are each disclosed with respect to a particular bit size for each data field, it is noted that any data field may be any suitable bit size as would be appreciated by one of ordinary skill in the art upon viewing this disclosure. In an example embodiment, the VPN ID may be an mVPN identifier. Additionally, the c-source field may indicate the address of the traffic source (e.g., a source host) within the mVPN 100. Further, the c-group field may indicate the multicast traffic destination address within the mVPN 100.

In an alternative example embodiment as shown in FIG. 4, the mRSVP-TE path message data packet 200c comprises a plurality of data fields, for example, a VPN ID 202c and an MDT number 208. The mRSVP-TE path message data packet 200c may be the same structure and/or format for both IPv4 and IPv6. Additionally, the mRSVP-TE path message data packet 200c for both IPv4 and IPv6 comprises a 64-bit VPN ID 202c and a 32-bit MDT number 208. While the example embodiment of FIG. 4 is disclosed with respect to a particular bit size for each data field, it is noted that any data field may be any suitable bit size as would be appreciated by one of ordinary skill in the art upon viewing this disclosure. In the example embodiment of FIG. 4, the VPN ID 202c may be an mVPN 100 identifier. The MDT number 208 may be an MDT identifier. The MDT number field may be an identifier for a default MDT or data MDT for a particular mVPN 100. For example, the MDT number 208 may be zero for a default MDT or a non-zero number for a data MDT. Additionally, the MDT number 208 may be assigned by a PE router (e.g., a source PE router 106).

Figure 5:
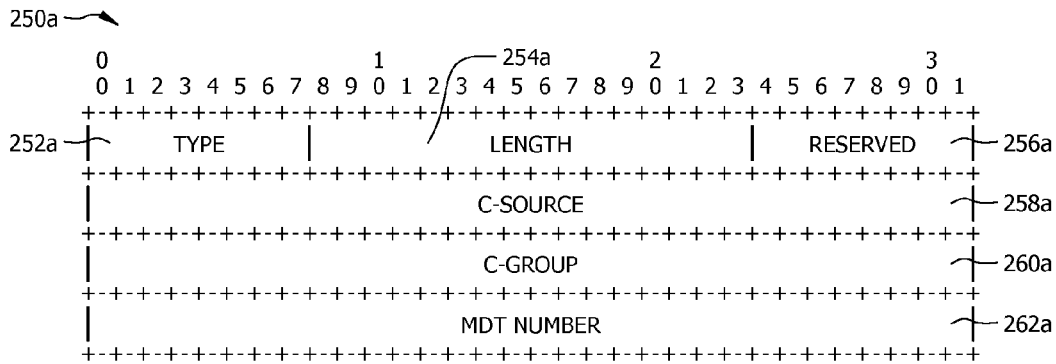
FIG. 5 is an example embodiment of a multicast distribution tree join data packet.
Figure 6:
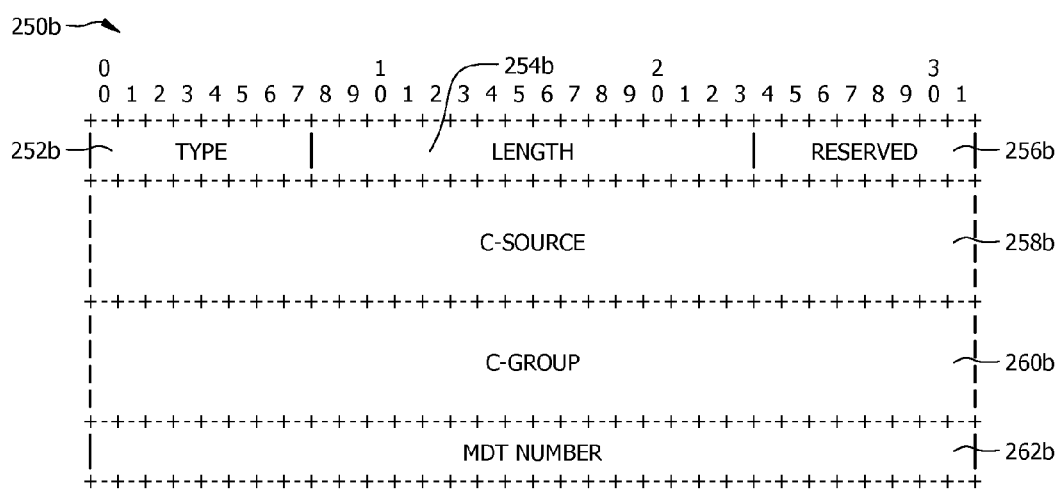
FIG. 6 is another example embodiment of a multicast distribution tree join data packet.

Referring to FIGS. 5-6, an MDT join type-length-value (TLV) data packet (e.g., an MDT join TLV data packet 250a, 250b, respectively) or MDT join message is illustrated. Referring to FIG. 5, an IPv4 MDT join TLV data packet 250a is illustrated. In the example embodiment of FIG. 5, the MDT join TLV data packet 250a comprises a plurality of data fields, for example, a type field 252a, a length field 254a, a reserved field 256a, a c-source address field 258a, a c-group address field 260a, and an MDT number field 262a. In such an example embodiment, the MDT join TLV data packet 250a for IPv4 comprises an 8-bit type field 252a, a 16-bit length field 254a, an 8-bit reserve field 256a, a 32-bit c-source address field 258a, a 32-bit c-group address field 260a, and a 32-bit MDT number 262a.

Referring to FIG. 6, an IPv6 an MDT join TLV data packet 250b is illustrated. In the example embodiment of FIG. 6, the MDT join TLV data packet 250b comprises a plurality of data fields, for example, a type field 252b, a length field 254b, a reserved field 256b, a c-source address field 258b, a c-group address field 260b, and an MDT number field 262b. In such an example embodiment, the MDT join TLV data packet 250b for IPv6 comprises an 8-bit type field 252b, a 16-bit length field 254b, an 8-bit reserve field 256b, a 128-bit c-source address field 258b, a 128-bit c-group address field 260b, and a 32-bit MDT number 262b.

While the example embodiments of FIGS. 5 and 6 are disclosed with respect to a particular bit size for each data field, it is noted that any data field may be any suitable bit size as would be appreciated by one of ordinary skill in the art upon viewing this disclosure. In the example embodiment of FIGS. 5 and 6, the type field may indicate the kind or type of message the data packet represents. The length field may indicate the length or size of the MDT join TLV data packet. The reserved field may be data field reserved for future use. In an example embodiment, the c-source address field and the c-group address field may be similarly configured and/or employed as previously disclosed with respect to the c-source address 204a and 204b and c-group address 206a and 206b. Additionally, the MDT number may be similarly configured and/or employed as previously disclosed with respect to the MDT number 208. Additional details for an mRSVP-TE path message data packet and an MDT join TLV data packet may be as described in U.S. patent application Ser. No. 13/931,434 entitled "Multicast Distribution Trees for mRSVP-TE Based Multicast Virtual Private Networks" by Lin Han, et al., which is hereby incorporated by reference in its entirety.

Figure 7:
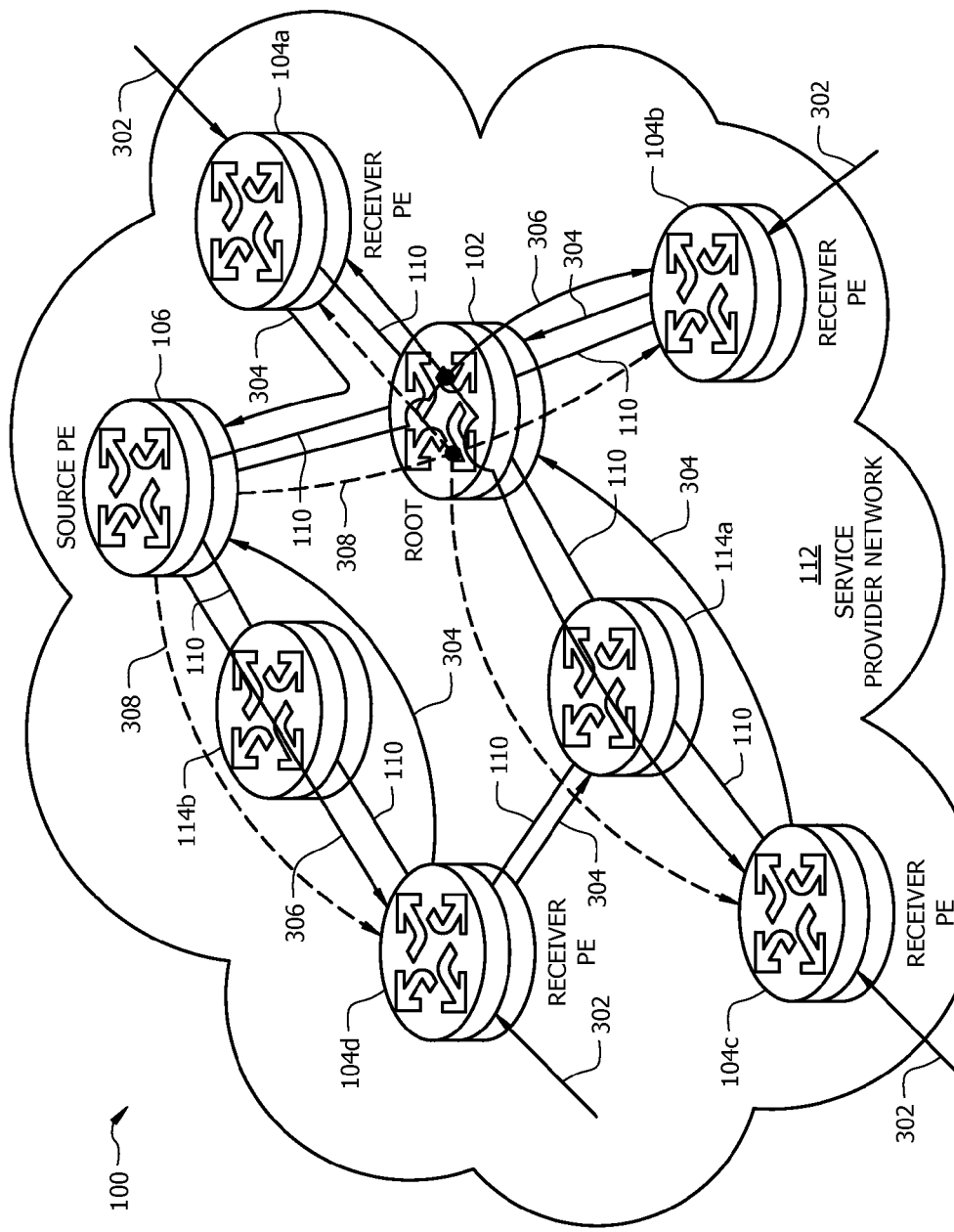
FIG. 7 is an example embodiment of a multicast virtual private network configuration.

Referring to FIG. 7, an example embodiment of an mVPN 100 is illustrated. In such an example, the mVPN 100 comprises a router within the service provider network 112 (e.g., core router 114a) configured to be a root router 102, such that, the root router 102 is in signal communication with a plurality of receiver PE routers 104, a source PE router 106, and core routers 114. For example, the root router 102 is coupled to a source PE router 106, a first receiver PE router 104a, a second receiver PE router 104b, and a third receiver PE router 104c and a fourth PE router 104d via a first core router 114a. Additionally, each of the PE routers (e.g., the receiver PE routers 104a-104d and the source PE router 106) may each be coupled to a CE router.

In such an example, the mVPN 100 may establish the default MDT to provide multicast data traffic services (e.g., to communicate multicast signaling and/or data packets), for example, to provide MP2MP data communication among the routers within the service provider network 112. Additionally, each of the receiver PE routers 104a-104d, the source PE router 106, and the CE routers are a part of the same mVPN and share a common VPN ID. For example, upon establishing and/or enabling the mVPN 100, the common VPN ID may be known and/or shared among the routers of the mVPN 100. In an example embodiment, an mRSVP-TE path message data packet may be generated by each PE router and is communicated within the mVPN 100 to the root router 102. Additionally, in response to the mRSVP-TE path message data packet, the root router 102 may communicate a response message to each PE router and thereby establish the default MDT. As such, the RPF interface of each of the PE routers of the default tree may be configured for MI-PMSI. Alternatively, the default MDT may be established via any other suitable method as would be appreciated by one of ordinary skill in the art upon viewing this disclosure.

Figure 8:
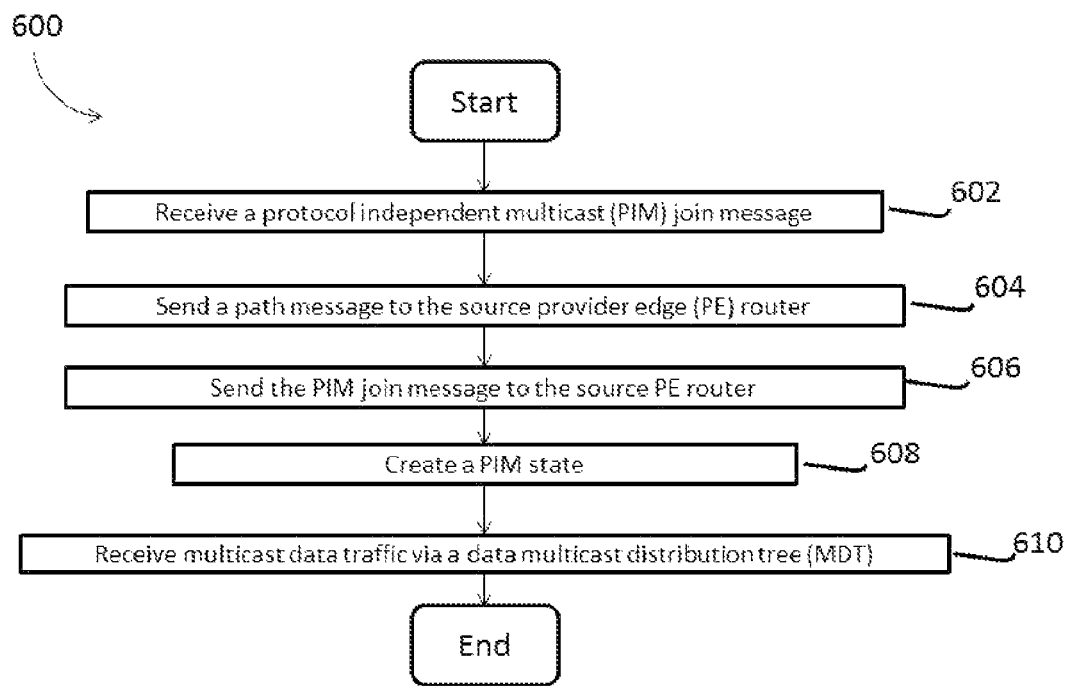
FIG. 8 is a flowchart of an example embodiment of a multicast data communication method.

FIG. 8 is a method for communicating multicast data 600 within a network, such as mVPN 100 as shown in FIG. 7. In block 602, a receiver PE router 104 receives a PIM join message (e.g., a PIM join/prune message, although only the join attributes are of interest in the method 600, so the PIM join/prune message may be referred to as a PIM join message) from a CE router. For example, one or more CE routers may communicate a PIM join message to a receiver PE router 104, for example, a PIM join message 302. In an example embodiment, the PIM join message 302 may comprise one or more PIM channel subscription requests (e.g., an (S, G) join message). For example, one or more receiver hosts requests to join group G and a source S via one or more receiver PE routers 104. In block 604, the receiver PE router 104 sends a path message (e.g., an mRSVP-TE path message) to a source PE router 106. For example, in response to receiving the PIM join message 302, the receiver PE router 104 communicates an mRSVP-TE path message data packet 304 (e.g., an mRSVP-TE path message data packet 200a, 200b) to the source PE router 106 (e.g., the source S) via the default MDT. In such an example, the mRSVP-TE path message data packet 304 comprises the (S, G) information and may be configured as previously disclosed with respect to the mRSVP-TE path message data packet. In block 606, the receiver PE router 104 also sends the PIM join message (e.g., PIM join message 302) to the source PE router 106. In block 608, a PIM state is created thereby forming a data MDT. For example, upon receiving the mRSVP-TE path message data packet 304 and the PIM join message 302, the PIM (S, G) is created at the source PE router 106 and each of the receiver PE routers 104 and, thereby establishes the data MDT 306. For example, the source PE router 106 set its OIF to PMSI(MVPN_ID, P2MP, (S, G)) and adds a PMSI(MVPN_ID, P2MP, (S, G)) for the data MDT to its OLIST. Additionally, the receiver sets the PMSI(MVPN_ID, P2MP, (S, G)) as its IIF. In block 610, the receiver PE router 104 receives multicast data traffic from the source PE router 106 via the data MDT. For example, upon establishing the data MDT 308, multicasts data traffic 308 may be communicated between the source PE router 106 and the receiver PE routers 104. Additionally, switching multicast data traffic from the default MDT to the data MDT is not required or performed.

Figure 9:
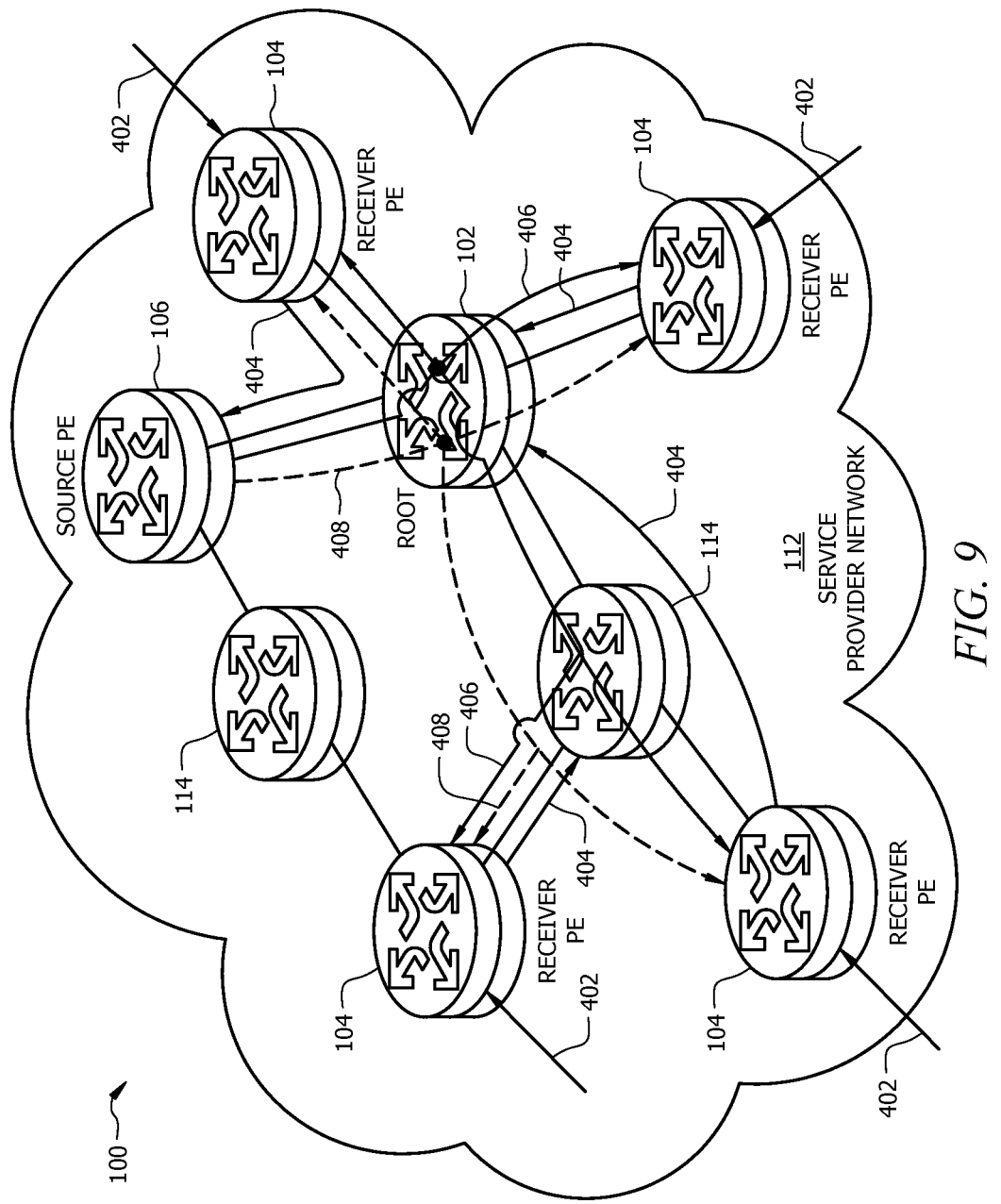
FIG. 9 is another example embodiment of a multicast virtual private network configuration.
Figure 10:
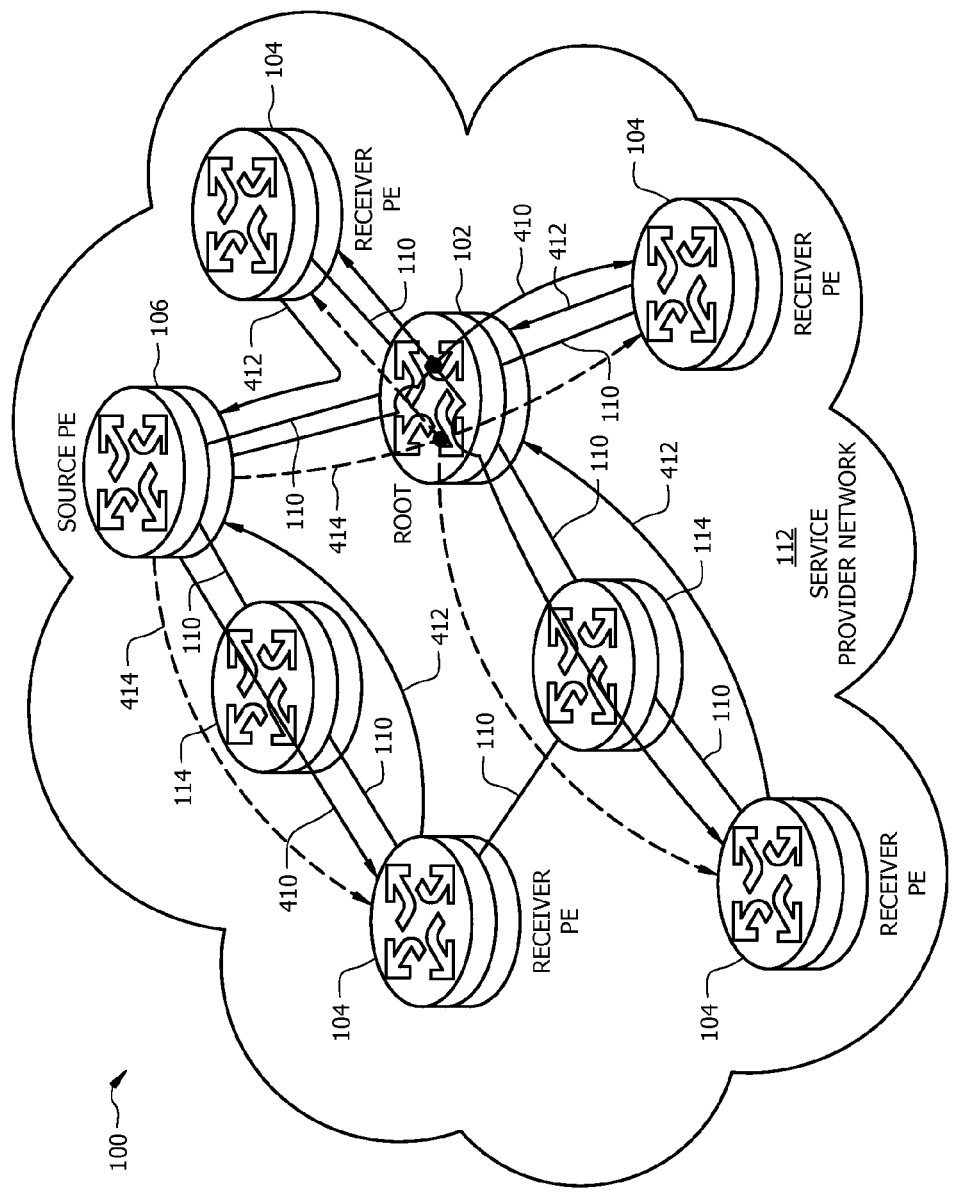
FIG. 10 is an example embodiment of a multicast distribution tree switching configuration.

Referring to FIGS. 9 and 10, an example embodiment of an mVPN 100 is illustrated. In such an example, the mVPN 100 and/or the default MDT may be established and/or configured similar to previously disclosed with respect to FIG. 7. Alternatively, the mVPN 100 and/or the default MDT may be established and/or configured via any suitable method and/or protocol as would be appreciated by one of ordinary skill in the art upon viewing this disclosure.

Figure 11:
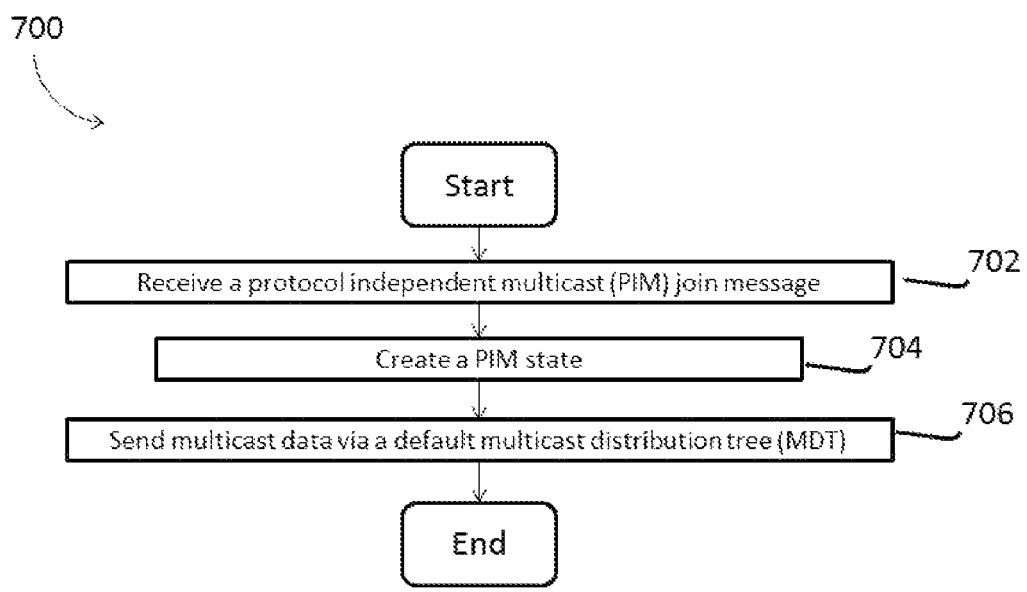
FIG. 11 is a flowchart of another example embodiment of a multicast data communication method.

FIG. 11 is an alternative example embodiment of a method for communicating multicast data 700 within a network, such as mVPN 100 as shown in FIGS. 9 and 10. In block 702, a source PE router 106 receives a PIM join message (e.g., a PIM join/prune message, although only the join attributes are of interest in the method 700, so the PIM join/prune message may be referred to as a PIM join message) from a receiver PE router 104. For example, referring to FIG. 9, one or more CE routers may communicate a PIM join message (e.g., a PIM join message 402) to a receiver PE router 104. In such an example embodiment, a PIM join message 402 may comprise one or more PIM channel subscription requests (e.g., an (S, G) join message). Additionally, the receiver PE router 104 sends the PIM join message 404 to the source PE router 106 via the default MDT. In block 704, a PIM state is created. For example, upon receiving the PIM join message 404, a PIM (S, G) state 406 is created at the source PE router 106 and each of the receiver PE routers 104. For example, the source PE router 106 set its OIF to MI-PMSI(MVPN_ID) and adds a MI-PMSI(MVPN_ID) for the default MDT to its OLIST. Additionally, the receiver sets the MI-PMSI(MVPN_ID) as its IIF. Upon creating the PIM (S, G) state 406, multicasts data traffic 408 may be communicated between the source PE router 106 and the receiver PE routers 104. In block 706, the source PE router 106 sends data from the source PE router 106 to the one or more receiver PE router 104 via the default MDT.

Additionally in an example embodiment, the source PE router 106 may monitor a rate of multicast data traffic within the default MDT. For example, referring to FIG. 10, the source PE router 106 monitors the multicast data traffic flow within the default MDT. The source PE router 106 determines if the rate of multicast data traffic within the default MDT exceeds a threshold. In response to the rate of multicast data traffic exceeding the threshold, the source PE router 106 sends a join message (e.g., an MDT join TLV data packet) to one or more receiver PE routers 104. For example, upon exceeding a predetermined multicast data traffic threshold (e.g., an upper data traffic flow rate limit), the source PE router 106 generates an MDT join TLV data packet 410 (e.g., MDT join TLV data packet 250a, 250b) and injects the MDT join TLV data packet 410 into the default MDT. The MDT join TLV data packet 410 will be received by all receiver PE routers 104 within the mVPN 100. Upon receiving the MDT join TLV data packet 410, the receiver PE router 104 communicates an mRSVP-TE path message data packet 412 (e.g., an mRSVP-TE path message data packet 200a, 200b, 200c) to the source PE router 106 (e.g., the source S) via the default MDT. In such an example, the mRSVP-TE path message data packet 412 comprises the (S, G) information and may be configured as previously disclosed with respect to the mRSVP-TE path message data packet. The source PE router 106 receives a path message (e.g., an mRSVP-TE path message) from the one or more receiver PE routers 104 and thereby establishes a data MDT. For example, upon receiving the mRSVP-TE path message data packet 412, the PIM (S, G) is created at the source PE router 106 and each of the receiver PE routers 104 and, thereby establishes the data MDT 414. For example, the source PE router 106 set its OIF to S-PMSI (MVPN_ID, P2MP, (S, G)) and adds a S-PMSI(MVPN_ID, P2MP, (S, G)) for the data MDT to its OLIST. Additionally, the receiver sets the S-PMSI(MVPN_ID, P2MP, (S, G)) as its IIF. The source PE router 106 sends data from the source PE router 106 to the one or more receiver PE router 104 via the data MDT. For example, upon establishing the data MDT 414, multicasts data traffic may be communicated between the source PE router 106 and the receiver PE routers 104. Additionally, multicast data traffic is switched from the default MDT to the data MDT.

Figure 12:
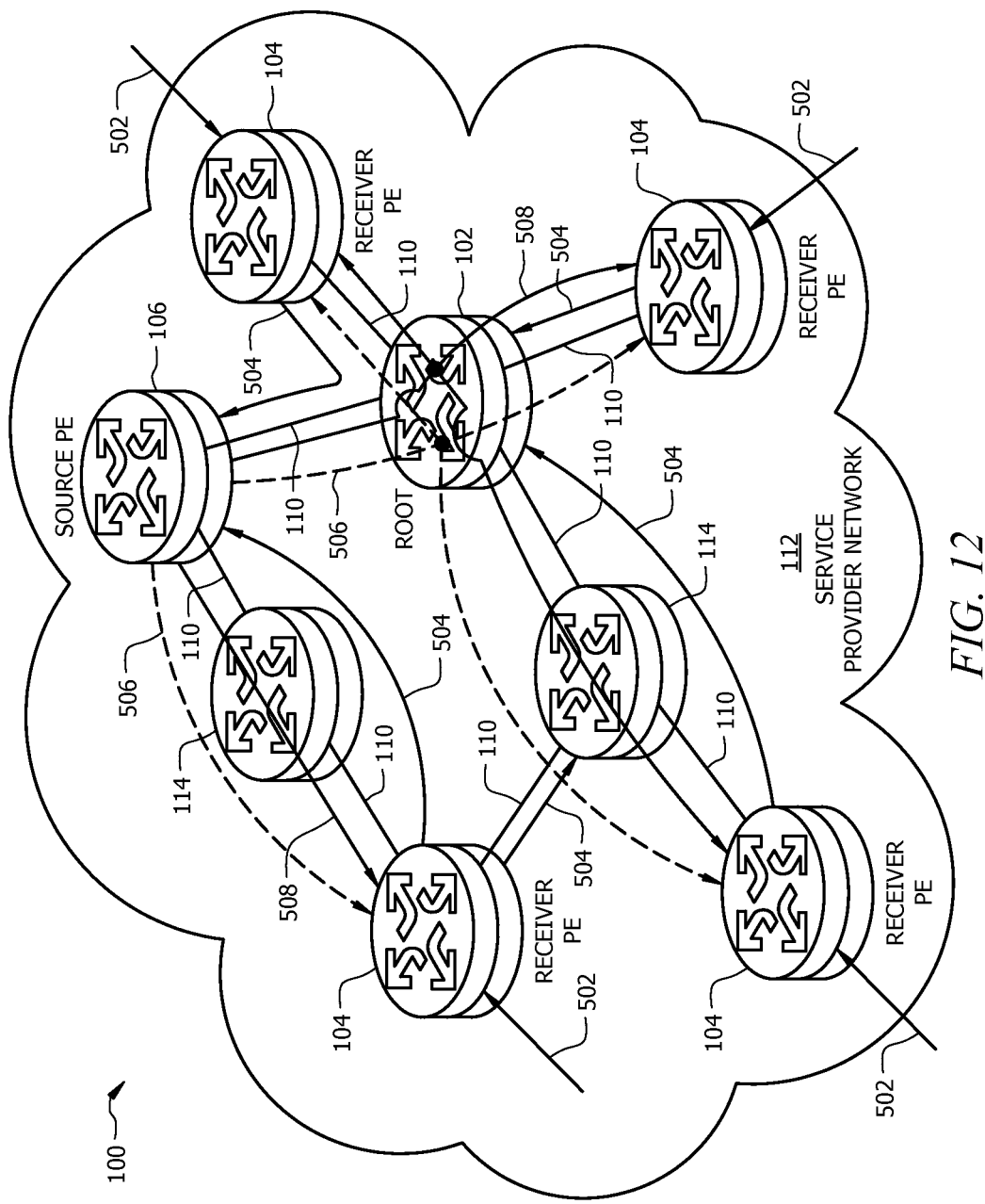
FIG. 12 is another example embodiment of a multicast virtual private network configuration.

Referring to FIG. 12, an example embodiment of an mVPN 100 is illustrated. In such an example, the mVPN 100 and/or the default MDT may be established and/or configured similar to previously disclosed with respect to FIG. 7. Alternatively, the mVPN 100 and/or the default MDT may be established and/or configured via any suitable method and/or protocol as would be appreciated by one of ordinary skill in the art upon viewing this disclosure.

Figure 13:
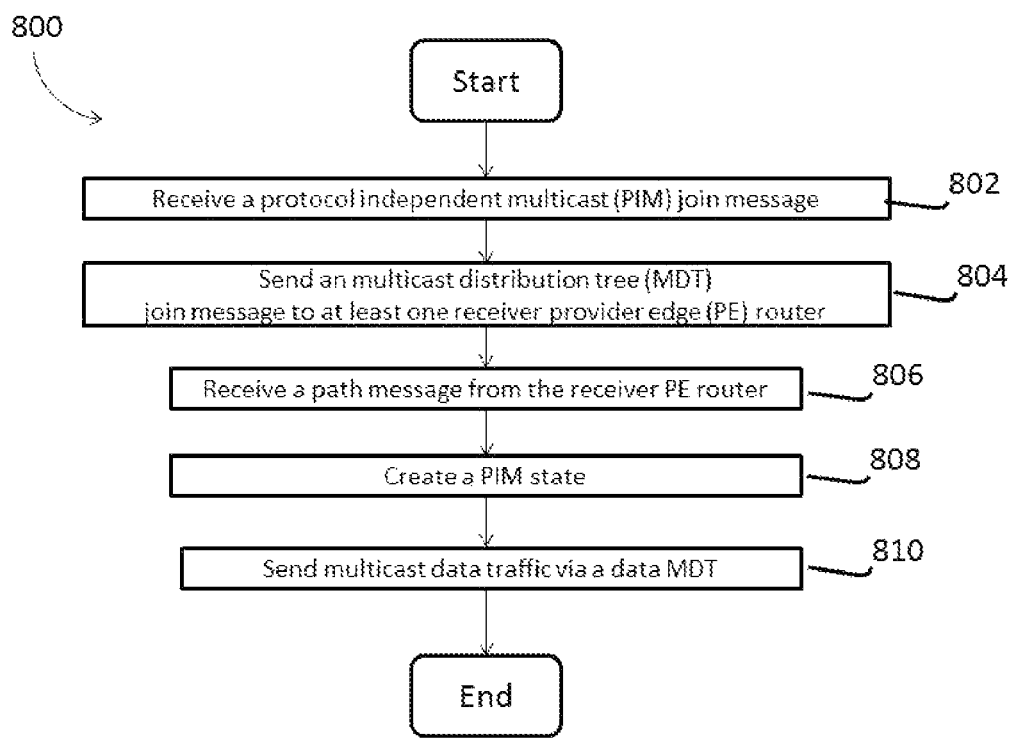
FIG. 13 is a flowchart of another example embodiment of a multicast data communication method.

FIG. 13 is another example embodiment of a method for communicating multicast data 800. In block 802, a source PE router 106 receives a PIM join message (e.g., a PIM join/prune message, although only the join attributes are of interest in the method 800, so the PIM join/prune message may be referred to as a PIM join message) from a receiver PE router 104. For example, one or more CE routers may communicate a PIM join message to a receiver PE router 104. In an example embodiment, a PIM join message 502 may comprise one or more PIM channel subscription requests (e.g., an (S, G) join message) and is also communicated to the source PE router 106. In an example embodiment, in response to receiving the PIM join message 502, the PIM (S, G) state is created at the source PE router 106 and each of the receiver PE routers 104 and, thereby establishes the data MDT 508. For example, the source PE router 106 set its OIF to S-PMSI(MVPN_ID, P2MP, (S, G)) and adds a S-PMSI(MVPN_ID, P2MP, (S, G)) for the data MDT to its OLIST. Additionally, the receiver sets the S-PMSI(MVPN_ID, P2MP, (S, G)) as its IIF. In block 804, the source PE router 106 sends an MDT join message (e.g., an MDT join TLV data packet) to at least one or more receiver PE routers 104. For example, the source PE router 106 generates an MDT join TLV data packet 506 (e.g., MDT join TLV data packet 250*a*, 250*b*) and injects the MDT join TLV data packet 506 into the default MDT. The MDT join TLV data packet 506 will be received by all receiver PE routers 104 within the mVPN 100. In block 806, the source PE router 106 receives a path message (e.g., an mRSVP-TE path message) from the one or more receiver PE routers 104. For example, upon receiving the MDT join TLV data packet 506, each of the receiver PE routers 104 communicates an mRSVP-TE path message data packet (e.g., an mRSVP-TE path message data packet 200*a*, 200*b*, 200*c*) to the source PE router 106 (e.g., the source S) via the default MDT. In such an example, the mRSVP-TE path message data packet comprises the (S, G) information and may be configured as previously disclosed with respect to the mRSVP-TE path message data packet. In block 808, a PIM state is created. For example, upon receiving the mRSVP-TE path message data packet 506, the PIM (S, G) is created at the source PE router 106 and each of the receiver PE routers 104 and, thereby establishes the data MDT 508. For example, the source PE router 106 set its OIF to S-PMSI(MVPN_ID, P2MP, (S, G)) and adds a S-PMSI(MVPN_ID, P2MP, (S, G)) for the data MDT to its OLIST. Additionally, the receiver sets the S-PMSI (MVPN_ID, P2MP, (S, G)) as its IIF. In block 810, the source PE router 106 sends multicast data traffic to the one or more receiver PE routers 104 via the data MDT. For example, upon establishing the data MDT 508, multicasts data traffic may be communicated between the source PE router 106 and the receiver PE routers 104. Additionally, switching multicast data traffic from the default MDT to the data MDT may not be required or performed. For example, multicast data traffic may be sent to the data MDT once established.

Figure 14:
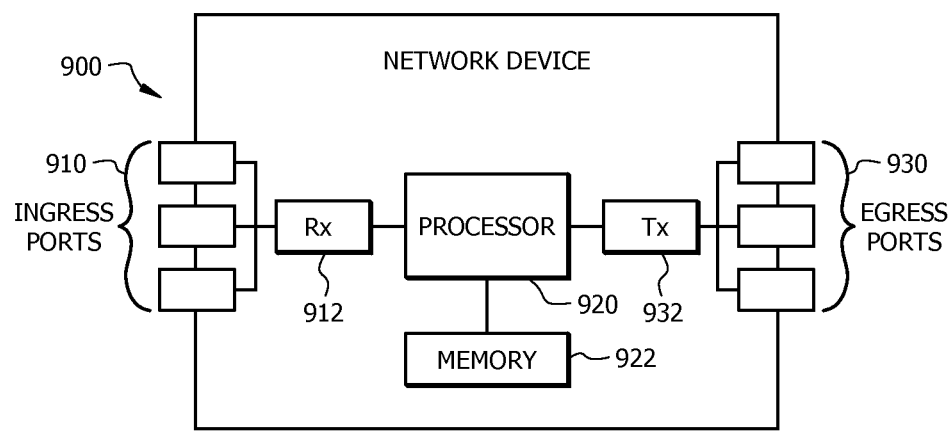
FIG. 14 is an example embodiment of a network device.

FIG. 14 illustrates an embodiment of a network device or apparatus 900, which may be any device configured to transport data frames or packets through a network. The network device 900 may comprise one or more ingress ports 910 coupled to a receiver 912 (Rx), which may be configured for receiving packets or frames, objects, options, and/or Type Length Values (TLVs) from other network components. The network device 900 may comprise a logic unit or processor 920 coupled to the receiver 912 and configured to process the packets or otherwise determine to which network components to send the packets. The logic unit or processor 920 may be implemented using hardware or a combination of hardware and software. The processor 920 may be implemented as one or more central processor unit (CPU) chips, cores (e.g., a multi-core processor), field-programmable gate arrays (FPGAs), application specific integrated circuits (ASICs), and/or digital signal processors (DSPs). The network device 900 may further comprise a memory 922.

The memory 922 may comprise secondary storage, random access memory (RAM), and/or read-only memory (ROM) and/or any other type of storage. The secondary storage may comprise one or more disk drives or tape drives and may be used for non-volatile storage of data and/or as an over-flow data storage device if the RAM is not large enough to hold all working data. The secondary storage may be used to store programs that are loaded into the RAM when such programs are selected for execution. The ROM may be used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and the RAM is typically faster than to the secondary storage.

The network device 900 may also comprise one or more egress ports 930 coupled to a transmitter 932 (Tx), which may be configured for transmitting packets or frames, objects, options, and/or TLVs to other network components. Note that, in practice, there may be bidirectional traffic processed by the network node 900, thus some ports may both receive and transmit packets. In this sense, the ingress ports 910 and the egress ports 930 may be co-located or may be considered different functionalities of the same ports that are coupled to transceivers (Rx/Tx). The processor 920, the receiver 912, and the transmitter 932 may also be configured to implement or support any of the procedures and methods described herein, such as the method for communicating multicast data 600, 700, and/or 800.

It is understood that by programming and/or loading executable instructions onto the network device 900, at least one of the processor 920 and the memory 922 are changed, transforming the network device 900 in part into a particular machine or apparatus (e.g., a source PE router, a receiver PE router, etc.). The executable instructions may be stored on the memory 922 and loaded into the processor 920 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

In an example embodiment, an mVPN 100 employing an MDT (e.g., a default MDT and a data MDT) and/or a method of use, as disclosed herein or in some portion thereof, may be advantageously employed to provide multicast services. In an example embodiment where PIM is used on a customer's site and mRSVP-TE is used on a service provider's network without PIM being enabled, an mVPN (e.g., mVPN 100) may be employed to provide the ability to inter-work the customer's PIM with the service provider's mRSVP-TE. Additionally, an mVPN (e.g., mVPN 100) provides the ability to employ a PIM-SSM protocol to support mRSVP-TE multicast data services between a source host and a plurality of receiver hosts. Therefore, the example embodiments disclosed herein improve the performance of a multicast data communication system.

At least one example embodiment is disclosed and variations, combinations, and/or modifications of the example embodiment(s) and/or features of the example embodiment(s) made by a person having ordinary skill in the art are within the scope of the disclosure. Alternative example embodiments that result from combining, integrating, and/or omitting features of the example embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, ... 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. All documents described herein are incorporated herein by reference.

While several example embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various example embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

We claim:

1. A method for supporting protocol independent multicast source-specific mode (PIM-SSM) in a receiver provider edge (PE) router using multicast resource reservation protocol-traffic engineering (mRSVP-TE) comprising the steps of:
receiving a protocol independent multicast (PIM) join message;
in response to receiving the PIM join message:
sending a path message to a source PE router, wherein the path message is an mRSVP-TE message;
sending the PIM join message to the source PE router via a default data multicast distribution tree (MDT), wherein the path message and the PIM join message trigger setup of the default MDT;
creating a PIM state;
receiving multicast data traffic via the default MDT using the PIM state; and
receiving an MDT join message from the source PE router when a rate of multicast data traffic within the default MDT has exceeded a threshold.

2. The method of claim 1, wherein the path message comprises a virtual private network identification (VPN ID) number, a customer source, and a customer group, wherein the customer source identifies a source address of the PIM state, and wherein the customer group identifies a group address of the PIM state.

3. The method of claim 1, wherein creating the PIM state comprises configuring a provider multicast service interface (PMSI) for an incoming interface (IIF).

4. The method of claim 1, wherein the PIM join message is sent via a default MDT.

5. A method for supporting protocol independent multicast source-specific mode (PIM-SSM) in a source provider edge (PE) router using multicast resource reservation protocol-traffic engineering (mRSVP-TE) comprising the steps of:
receiving a protocol independent multicast (PIM) join message from at least one receiver PE router via a default multicast distribution tree (MDT), wherein the PIM join message comprises a source address and a group address;
creating a protocol independent multicast (PIM) state using the source address and the group address;
sending multicast data traffic via the default MDT using the PIM state;
monitoring a rate of multicast data traffic within the default MDT; and
sending an MDT join message to the at least one receiver PE router when the rate of multicast traffic within the default MDT has exceeded a threshold.

6. A method for supporting protocol independent multicast source-specific mode (PIM-SSM) in a source provider edge (PE) router using multicast resource reservation protocol-traffic engineering (mRSVP-TE) comprising the steps of:
receiving a protocol independent multicast (PIM) join message from at least one receiver PE router via a default multicast distribution tree (MDT), wherein the PIM join message comprises a source address and a group address;
creating a protocol independent multicast (PIM) state using the source address and the group address;
sending multicast data traffic via the default MDT using the PIM state;
monitoring a rate of multicast data traffic within the default MDT;
determining that the rate exceeds a threshold;
sending an MDT join message to the at least one receiver PE router in response to determining, wherein the MDT join message comprises an MDT number that identifies a data MDT;
receiving a path message from the at least one receiver PE router and thereby forming the data MDT; and
sending multicast data traffic via the data MDT.

7. The method of claim 6, wherein the path message is a multicast resource reservation protocol-traffic engineering (mRSVP-TE) message and comprises a virtual private network identification (VPN ID) number, the customer source, and the customer group.

8. The method of claim 6, wherein the path message is a multicast resource reservation protocol-traffic engineering (mRSVP-TE) message and comprises a virtual private network identification (VPN ID) number and an MDT number.

9. The method of claim 5, wherein creating the PIM state comprises configuring a multidirectional inclusive provider multicast service interface (MI-PMSI) for an outgoing interface (OIF), and wherein sending the multicast data traffic comprises sending the multicast data traffic over the OIF.

10. The method of claim 6, wherein the MDT join message comprises a customer source and a customer group.

11. The method of claim 6, wherein sending multicast data traffic via the data MDT comprises switching multicast data traffic from the default MDT to the data MDT.

12. The method of claim 6, wherein receiving the path message from the at least one receiver PE router comprises triggering a PIM state change.

13. The method of claim 12, wherein triggering the PIM state change comprises configuring a selective provider multicast service interface (S-PMSI) for an outgoing interface (OIF).

14. A method for supporting protocol independent multicast source-specific mode (PIM-SSM) in a source provider edge (PE) router using multicast resource reservation protocol-traffic engineering (mRSVP-TE) comprising the steps of:
receiving a protocol independent multicast (PIM) join message from at least one receiver PE router via a default multicast distribution tree (MDT), wherein the PIM join message comprises a source address and a group address;
sending an MDT join message to the at least one receiver PE router in response to receiving the PIM join message, wherein the MDT join message comprises an MDT number that identifies a data MDT;
receiving a path message from the at least one receiver PE router and thereby forming the data MDT;
creating a PIM state using the source address and the group address;
sending multicast data traffic via the data MDT using the PIM state;
wherein the MDT join message is sent to the at least one receiver PE router when a rate of multicast traffic within the default MDT has exceeded a threshold.

15. The method of claim 14, wherein the path message is an mRSVP-TE path message comprising a virtual private network identification (VPN ID) number identifying a multicast virtual private network over the data MDT.

16. The method of claim 14, wherein the PIM join message is received over a default MDT, and wherein the MDT join message is sent over the default MDT.

17. The method of claim 15, wherein the path message further comprises the MDT number.

18. The method of claim 14, wherein the MDT join message comprises a customer source, a customer group, and the MDT number.

19. The method of claim 14, wherein receiving multicast data traffic via the data MDT does not require switching multicast data traffic from a default MDT to the data MDT.

20. The method of claim 14, wherein creating the PIM state comprises configuring a selective provider multicast service interface (S-PMSI) for an outgoing interface (OIF).

* * * * *